Jan. 12, 1926.
W. G. FORDING
TIRE STAND
Filed Jan. 17, 1923
1,569,737
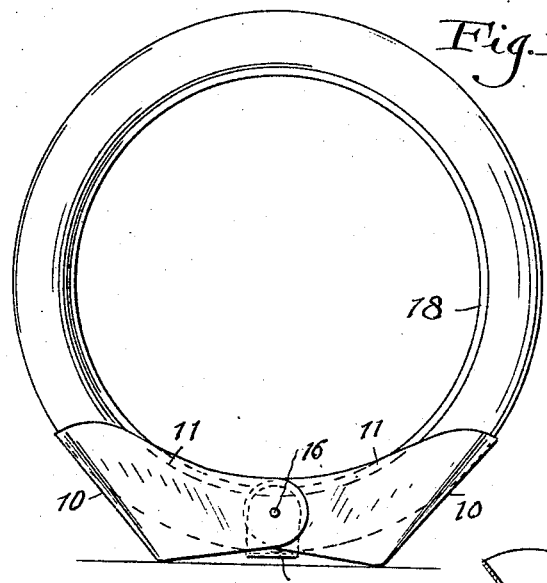
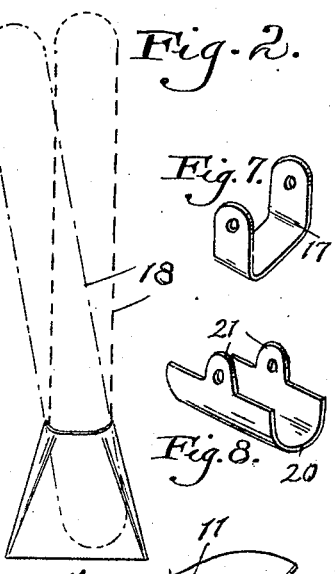
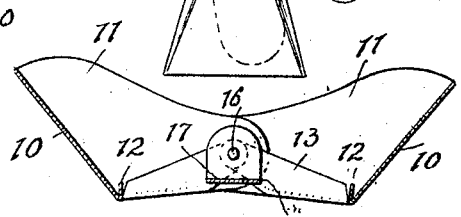
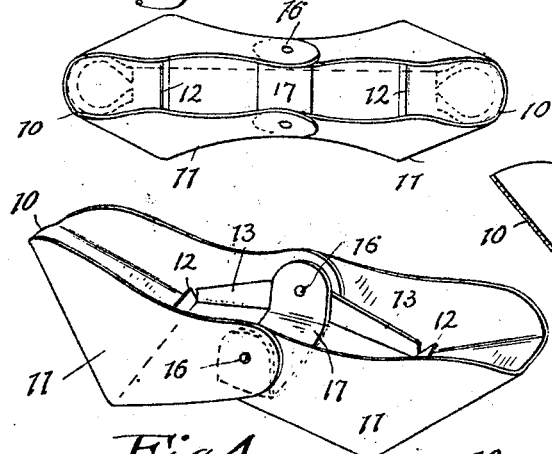
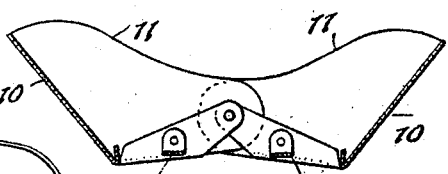
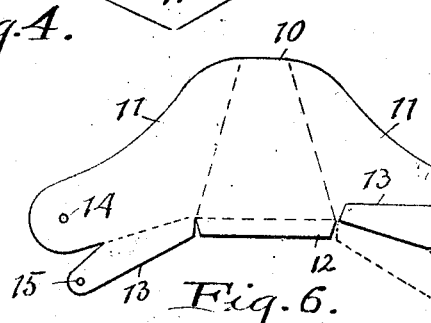

Patented Jan. 12, 1926.

1,569,737

UNITED STATES PATENT OFFICE.

WILLIAM G. FORDING, OF LAKEWOOD, OHIO.

TIRE STAND.

Application filed January 17, 1923. Serial No. 613,227.

*To all whom it may concern:*

Be it known that I, WILLIAM G. FORDING, a citizen of the United States, residing at Lakewood, in the county of Cuyahoga and State of Ohio, have invented a certain new and useful Improvement in Tire Stands, of which the following is a full, clear, and exact description.

This invention relates to stands for supporting automobile tires or other similar articles and is constructed to receive the lower peripheral portion of a tire and to support the same in upright position for the purpose of display.

An object of the invention is to provide a stand of light weight which can be cheaply manufactured and which will form a stable support for a tire so that the tire will not topple over when subjected to jars or vibrations.

A further object is to provide a light flexible tire stand capable of supporting the tire in positions inclined somewhat from the vertical as well as in vertical position.

A further object is to provide a stand formed with rocking end supports and an intermediate support so connected that the tire has a three point balanced support on the stand.

A further object of the invention is to provide a stand in the form of a receptacle adapted to receive a peripheral portion of the tire and having walls of light flexible sheet material provided with tire engaging means through which the weight of the tire causes the flexible walls to be drawn into gripping engagement with the tire.

A further object is to provide a supporting stand capable of receiving and supporting tires of different sizes.

A further object is to provide a tire stand formed of cardboard light and flexible enough to be creased for bending to any desired angle without breaking whereby the blanks may be creased for bending to the desired form and shipped to the user in flat or knocked down form.

A further object is to provide a tire stand comprising a pair of pivotally connected rocking supports formed of flexible sheet material in which the supporting edges are stiffened by folding the sheet material back upon itself.

A further object is to provide a tire stand in which the pivotally connected rocking tire engaging members are formed of flexible sheet material and the hinge connection between the rocking members is effectively reinforced by folding the sheet material upon itself to provide pivot receiving portions of double thickness.

With the above and other objects of the invention in view, my invention consists in the improved tire stand illustrated in the accompanying drawings and hereinafter described and particularly claimed, and in such variations and modifications thereof as will be obvious to those skilled in the art.

Reference should be had to the accompanying drawings forming a part of this specification in which Fig. 1 is a side elevation of the tire stand with the tire supported therein; Fig. 2 is an end elevation of the tire stand with a tire supported therein showing in dotted lines a tire supported at a slight inclination to the vertical; Fig. 3 is a section taken on line 3—3 of Fig. 1 showing the tire in dotted lines and a top plan of the tire stand gripping the tire; Fig. 4 is a perspective view of the tire stand; Fig. 5 is a longitudinal section through the tire stand; Fig. 6 is a plan view of a blank from which the sections of the tire stem are formed; Fig. 7 is a detail perspective view of the intermediate tire supporting member; Fig. 8 is a perspective view of a modified form of the intermediate tire supporting member; Fig. 9 is a vertical section through a tire stand showing an alternative form of intermediate tire support.

Referring to the accompanying drawings, the tire stand is formed of flexible sheet material and consists of two pivotally connected end members which have a rocking support upon the floor and an intermediate supporting member adapted to be engaged by the tire between the rocking supports of the end members whereby the tire has a three point balanced support upon the tire stand. While various materials may be used in constructing the stand as shown herein, each of the two end members of the stand is preferably formed from a cardboard blank such as shown in Fig. 6 which is creased along the lines about which the material is to be folded. Each end member has a body portion 10 which is wide at the bottom and tapers toward the top and side wings 11 which are adapted to be folded about the tapered sides of the body portion 10. The body portion 10 has a flap 12 at its lower edge which is adapted to be folded up to stiffen the lower edge of the body member and to provide a rounded supporting edge which will not readily be worn away. The side wings 11 have flaps 13 along their lower edges which are adapted to be folded up against the wings 11 and the wings 11 and flaps 13 adjacent their outer ends have holes 14 and 15 which register when the flaps 13 are folded against the wings 11. The outer ends of the wings 11 of the two end members are pivotally connected by means of rivets or fasteners 16 which pass through the openings 14 and 15 of the doubled portions of the two wings. When the two end sections are pivotally connected together they form an open topped receptacle adapted to receive a peripheral portion of a tire, the tapered bodies 10 of the end members forming the end walls of the receptacle and the pivotally connected wings forming the side walls of the receptacle. The end walls 10 extend outwardly and upwardly from their lower edges and are adapted to be engaged by the periphery of the tire, the lower edges of the end walls 10 forming rocking supports for the pivotally connected tire engaging members. An intermediate tire supporting member in the form of a U-shaped strap 17 is suspended from the side walls of the receptacle and secured thereto by means of the fasteners 16. By reason of the fact that the portion 10 of each of the end members is tapered toward the top, the tire walls of the receptacle formed by the wings 11 which are folded upon the sides of the portion 10 will be inclined inwardly. When a tire 18 is placed upon the supporting stand the peripheral portions thereof will first engage the end portions 10 which will cause the end sections to rock about the lower edges of the portions 10 and elevate the intermediate support 17 into engagement with the tire. Since the stand is formed of light flexible sheet material, the end portions engaged by the tire will conform to the shape of the tire and the sides 11 due to the fact that they are inclined inwardly and have a portion of the weight of the tire imposed upon them above their lower edges through the supporting member 17 are drawn into gripping engagement with the tire. By reason of the rocking support the weight of the tire is taken up partially by the intermediate support 17. The central portion of the supporting stand has some lateral flexibility and the tire supported therein can be tilted slightly from the vertical and still be supported by the stand. By reason of the balanced support of the tire and the gripping action, the tire will be supported by the stand in positions inclined somewhat to be vertical as long as the center of gravity of the tire lies within the wide transverse supporting edges formed by the folded edges of the end portions 10.

In Fig. 8 of the drawing is shown a modified form of intermediate supporting member which may be used in place of the intermediate tire engaging member 17. This support consists of an elongated substantially semi-cylindrical body portion 20 having upwardly extending ears 21 provided with holes to receive the fastener 16.

In Fig. 9 of the drawing a modified form of intermediate support is shown in which a pair of cross-straps 22 are connected to the reinforced portions of each of the side wings 11 on opposite sides of the pivots 16. The operation in this form is substantially the same as in that previously described, a portion of the weight of the tire being carried by the intermediate supports 22.

Having described my invention, I claim—

1. A support for a circular article comprising an elongated receptacle adapted to receive a peripheral portion of said article, said receptacle having flexible side and end walls and means carried by the side walls and adapted to be engaged by said article to cause said side walls to grip the article.

2. A support for a circular article comprising an elongated receptacle adapted to receive a peripheral portion of said article, said receptacle having transversely extending floor engaging portions adjacent the ends thereof, flexible end walls engageable with the periphery of said article, flexible side walls connecting said end walls and means adapted to be engaged by the article to draw the flexible side walls inwardly into gripping engagement with the article.

3. A support for a circular article, comprising a pair of substantially U-shaped supporting members formed of flexible sheet material, each supporting member having an outwardly inclined body portion and inwardly extending side wings, the side wings of said sections being pivotally connected above the lower edges of the body portions of the members, said members being supported upon the transverse lower edges of the body portions thereof, and a transverse supporting member carried by the side wings intermediate the supporting edges.

4. A support for a circular article, comprising a receptacle adapted to receive a peripheral portion of the article, said receptacle having two substantially identical end members of flexible sheet material and of substantially U-shape, each having a portion forming an outwardly inclined end wall of the receptacle and portions extending inwardly therefrom, said inwardly extending portions of the two sections being inclined inwardly and pivotally connected together to form the side walls of the receptacle, and an intermediate flexible supporting member extending between the side walls and connected thereto above the lower edges thereof whereby the side walls of the receptacle are adapted to be drawn by the weight of the article into gripping engagement with the article.

5. A support for a circular article, comprising an elongated receptacle adapted to receive a peripheral portion of the article, said receptacle having spaced transversely extending rigid base portions adapted to rest upon the floor and flexible side and end wall portions, said end wall portions forming supports for the article outside the base portions and a transverse support carried by the side walls intermediate the base portions.

6. A support for a circular article comprising two pivotally connected substantially U-shaped supporting members formed of sheet metal each having rigid transverse supporting edges parallel to the pivotal axis and article supporting portions outside and above said supporting edges, and a support carried by said members intermediate said supporting edges, whereby said article has a three point balanced support.

7. A support for a circular article, comprising a receptacle adapted to receive a peripheral portion of the article, said receptacle having flexible walls and spaced rigid transverse supporting edges, the end portions of the walls being adapted to engage the article outside said rigid supporting edges, and a supporting strap connecting the flexible side walls between said supporting edges.

8. A support for a circular article comprising a receptacle adapted to receive a peripheral portion of the article, said receptacle having spaced transverse supporting edges and flexible side and end walls, said end walls being inclined upwardly and outwardly from said supporting edges, and a supporting strap connecting the side walls intermediate the supporting edges.

9. In a support for a circular article, a receptacle adapted to receive a peripheral portion of the article, comprising U-shaped end sections formed of flexible sheet material, each having a body portion forming an end wall of the receptacle and side wing portions, the body portion of each section having a straight lower supporting edge and tapering toward the top, the side wing portions of the two sections being pivotally connected and forming the inwardly inclined side walls of the receptacle, the end walls of the receptacle being inclined outwardly from the supporting edge and adapted to receive peripheral portions of the article, and a supporting strap suspended from side walls between the supporting edges of the receptacle.

10. A support for a circular article comprising a pair of rocking supporting members each having a transverse horizontal supporting edge forming a fulcrum, said members having a horizontal pivotal connection intermediate said supporting edges, each member having means extending outwardly and upwardly from its supporting edge adapted to engage and grip said article and a transverse supporting strap carried by the sections adjacent the pivot.

11. A support for a circular article comprising two rocking supporting members each having a transverse horizontal supporting edge forming a fulcrum, each member having means extending outwardly and upwardly from its supporting edge adapted to grip said article, and an intermediate supporting member to which said rocking members are pivotally connected intermediate the supporting edges of the members.

12. A support for a circular article comprising two rocking supporting members, each formed of flexible sheet material and having a body portion tapered toward the top and having inwardly extending side wings, said side wings being pivotally connected, each member having a rocking support on the lower edge of the body portion thereof, the body portion extending outwardly and upwardly from the supporting edge, and an intermediate support carried by the side wings intermediate the supporting edges of the rocking members.

13. A tire stand comprising two rocking supporting members, each formed of flexible sheet material and having a body portion tapered toward the top and having inwardly inclined side wings extending inwardly therefrom, the wings of the two members being pivotally connected, the body portion of each support extending outwardly and upwardly from its lower edge, said body portion and side wings being adapted to conform to the portion of the tire resting thereon, and a U-shaped strap suspended from the pivot of the side wings adapted to be engaged by a portion of the tire between said rocking supports.

14. A support for a circular article comprising a pair of supporting members of identical construction, each of said members being formed of flexible sheet material and having a body portion with a straight lower edge forming a rocking support, said body portion being inclined outwardly from its lower edge and tapered toward the top, side wings extending inwardly from the body portion, each side wing having its lower edge folded back upon itself to provide a reinforced portion of double thickness, the side wings of the two supporting members being connected by means of fasteners extending through the reinforced portions of the wings and forming pivotal connections, and an intermediate supporting member carried by the side wings.

15. A support for a circular article comprising a pair of supporting members of identical construction, each of said members being formed of flexible sheet material and having a body portion with a straight lower edge forming a rocking support, the lower edge of said body portion being bent back upon itself to stiffen the supporting edge, side wings extending inwardly from the body portion, said side wings of the two members being pivotally connected, and an intermediate supporting member carried by the side wings.

In testimony whereof, I hereunto affix my signature.

WILLIAM G. FORDING.